United States Patent Office 2,701,312
Patented Feb. 1, 1955

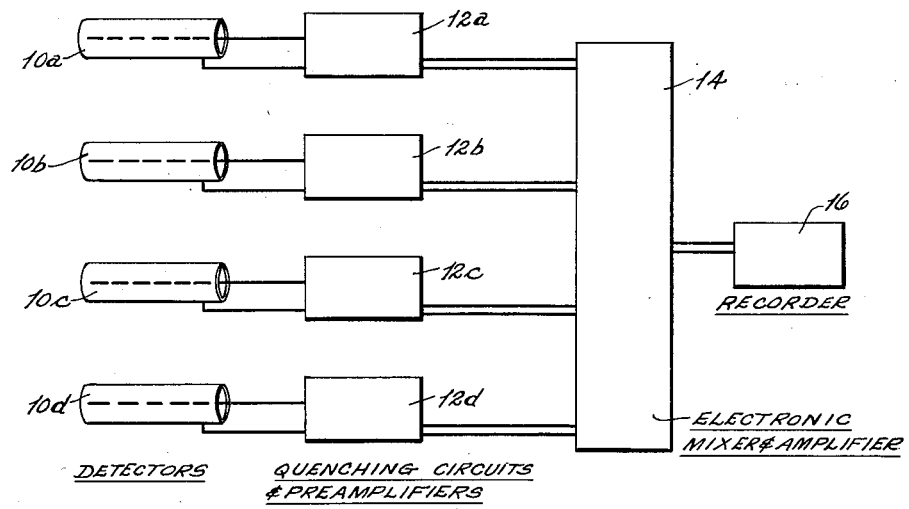

2,701,312

GAMMA RAY MEASUREMENT

Arthur H. Lord, Jr., Houston, Tex., assignor to The Texas Company, New York, N. Y., a corporation of Delaware Application March 18, 1950, Serial No. 150,427

2 Claims. (Cl. 250—83.6)

This invention relates to gamma ray detection and particularly to a method and an apparatus in which a group or bank of several radiation detectors is utilized in such a manner that the inherent circuit losses are kept very low.

In the detection of gamma radiation, it is quite common to use detecting devices of the counter or electrical pulse-producing type. As is generally well known, this type of detector usually comprises a sealed housing containing a gas filling, a cathode and an anode. The gas is usually at about or slightly below atmospheric pressure. A high potential of the order of about 1,000 volts is impressed across the cathode and the anode through a resistor and normally the potential difference between the cathode and the anode is nearly, but not quite, high enough to cause a discharge to take place. If a gamma ray strikes the cathode so as to eject an electron therefrom, the gas will ionize and a discharge or pulse occurs with a current flow of the order of a few microamperes. This causes a large voltage drop across the resistor and by suitably amplifying this sudden voltage drop, a device capable of registering the discharge of the counter may be actuated. By using a suitable gas in the counter, such as argon, a mixture of argon and petroleum ether or argon and ammonia, the discharge of the counter can be caused to stop or be quenched quickly so that the counter will be ready to detect the next ionizing particle. It is also quite common to use a suitable electronic quench circuit in the output circuit of the counter, this circuit also aiding in the quick quenching of the counter.

It is often desirable to use several, i. e., a bank of counters, disposed close to each other so as to provide a greater sensitivity for the radiation to be detected. It has been proven experimentally that if two or more counters are connected in parallel, i. e., with their cathodes connected together and their anodes also connected together, the total number of counts observed for a given time interval is substantially less than the sum of the counts observed for the same detectors when operated separately. This effect is due chiefly to the increase in electrical capacity across the counters when they are connected in parallel since the capacity of all of the counters is present across each counter. This condition substantially increases the recovery time each time one of the counters functions to produce a pulse. By "recovery time" is meant, of course, the time required for a pulse or discharge to be stopped or quenched so that the counter will be ready for the next gamma ray to be detected and the recovery or rise of the voltage at the counter anode to its original value.

In accordance with the invention, a separate quenching circuit, and if desired, a separate preamplifier or pulse equalizer is connected to each of the counters employed and the outputs of all of the preamplifiers or pulse equalizing circuits are then electronically mixed, the output of the mixer then being recorded in the form of a single record. Experiments have proven that such an arrangement is very satisfactory, the only losses occurring being those due to the coincidence counts which may occur in two or more detectors of the group. This factor of coincidence counting can usually be considered to be substantially negligible.

Referring to the single figure of the drawing, a circuit is shown somewhat diagrammatically and which illustrates the electrical connections for a group, four in this instance, of gamma ray counters $10a$, $10b$, $10c$ and $10d$. The output of each of the counters is connected to any suitable device such as $12a$ which contains any suitable quenching and preamplifying circuit. These circuits are well known and since their details do not constitute the invention, it is believed that they need no further discussion. The Neher-Pickering quench circuit is one of the several which will be satisfactory. The outputs of the preamplifiers $12a$, $12b$, $12c$ and $12d$ are conducted to any suitable form of electronic mixer and amplifier 14, the output of which is in turn connected to a recording device 16. The pulses from the individual counters $10a$, $10b$, etc. occurring, of course, at random intervals are separately preamplified and conducted to the device 14 where all of the pulses from all of the counters are electronically mixed and recorded at 16 with none of the losses which would be inherent in the circuit if the counters $10a$, $10b$, etc. were first connected electrically in parallel and their output then amplified and recorded.

The detectors $10a$—$10d$ may be conventional Geiger-Mueller counters, but preferably they are multi-cathode plate counters of the type disclosed in the U. S. Letters Patent No. 2,397,071 granted to D. G. C. Hare, March 19, 1946. These counters are several times more efficient in detecting gamma rays than the conventional counters.

If desired, the circuit arrangement described above can be used where the detectors are of the proportional counter type which, as is well known, may be used to distinguish between high and low energy ionizing particles since the size of the pulses produced depend upon the energy of the radiation intercepting the cathode.

Obviously, many other modifications and variations of the invention as hereinbefore set forth may be made without departing from the spirit and scope thereof, and therefore only such limitations should be imposed as are indicated in the appended claims.

I claim:

1. An apparatus for measuring gamma ray intensities comprising a plurality of individual gamma ray counters adapted to be exposed to said radiation, a separate quenching and preamplifying circuit connected to each of said counters, a common mixing and amplifying circuit connected to receive the outputs of all of said preamplifiers and single means for recording the sum of the amplified pulses of all said counters.

2. A method of measuring the intensity of gamma rays which comprises exposing to said gamma rays a plurality of separate detectors of the pulse-producing type, preamplifying and quenching the pulses from said counters separately, and electronically mixing the preamplified pulses from all of the detectors to obtain a single composite record.

References Cited in the file of this patent

UNITED STATES PATENTS

| | | |
|---|---|---|
| 2,316,361 | Piety | Apr. 13, 1943 |
| 2,489,133 | Herzog | Nov. 22, 1949 |
| 2,493,346 | Herzog | Jan. 3, 1950 |
| 2,499,311 | Herzog et al. | Feb. 28, 1950 |
| 2,506,149 | Herzog | May 2, 1950 |
| 2,560,166 | Glenn, Jr. | July 10, 1951 |

OTHER REFERENCES

Design and Operation of an Improved Counting Rate Meter, Kip et al., Review of Sci. Instruments, September 1946, vol. 17, No. 9, pages 323–327.

A Pulse Analyzer for Nuclear Research, Freundlich et al., Rev. of Sci. Instruments, February 1947, vol. 18, No. 2, pages 90–100.

Electrons and Nuclear Counters, Korff, publ. April 1946, D. Van Nostrand Co., Inc., New York, N. Y., pp. 158–162.